INVENTOR.
ARTHUR A. LAVINE

June 25, 1968  A. A. LAVINE  3,390,271
OBSTACLE WARNING DEVICE

Filed May 25, 1964

INVENTOR.
ARTHUR A. LAVINE

BY

ATTORNEY

INVENTOR.
ARTHUR A. LAVINE

United States Patent Office 3,390,271
Patented June 25, 1968

3,390,271
OBSTACLE WARNING DEVICE
Arthur A. Lavine, 5322 Waupaca Road,
Palos Verdes Estates, Calif. 90274
Filed May 25, 1964, Ser. No. 382,426
12 Claims. (Cl. 250—199)

The device of the subject invention relates to apparatus warning of the presence of obstacles and more particularly to means for detecting small obstacles within a limited field of view and range of interest.

In the tactical use of airborne military vehicles such as helicopters, it is frequently required that such vehicles operate at extremely low altitudes or very close to the ground. Such low-level flight operation is required for search and rescue missions, for penetration of enemy territory with minimum probability of detection by the enemy, and for other reasons. Such low level flight operation is hazardous, even under daylight visual conditions, due to the random occurrence of power lines, telephone poles, radio station antennas and other cable-like obstacles, which obstacles are difficult to detect because of both (1) the demands of the primary flight mission upon the pilot's attention, and (2) the difficulty of perceiving such slender but dangerous obstacles. Such difficulty arises from the limited resolution of the human eye and the presnce of background clutter within the field of view. At nighttime, of course, the hazardous nature of such flight mission is aggravated.

A broad object of the subject invention is to provide sensing means, for the generation of a warning signal or other cue, in response to sensed slender obstacles lying along and about the vehicle flight path, whereby the pilot may be enabled to confidently maneuver the vehicle in time so as to avoid such obstacle.

A passive optical sensing system, even if sensitive at low light intensities, cannot be effectively employed for obstacle warning functions for the reasons that range information cannot be derived from such device, whereby nearby obstacles of interest can be distinguished from distant obstacles of little or no interest. Further, although prior-art radar systems have been employed to provide range and directional information, such devices do not have the angular resolution (i.e., narrow beamwidth) and range resolution (i.e., short wavelength and narrow pulsewidth) necessary to detect and locate slender, cable-like obstacles with the precision required.

However, the advent of laser means for generating coherent light prvides the basis for an active sensing system providing the desired angular and range resolution.

The concept of the subject invention is to provide efficient pulsed light means having a high signal-to-noise ratio for detecting the direction of slender objects occurring within a selected range and selected field of view.

In a preferred embodiment of the subject invention, there is provided a source of cyclically generated pulses of coherent light for illuminating a selected field of view, and an image orthicon device responsive to received reflections of the light pulses. There is further provided means responsive to the speed of a utilizing vehicle (in which the invention is utilized) for limiting both the field of view and range-time within which the image orthicon is responsive to such received energy.

In normal operation of such arrangement, warning signals are provided which are indicative of obstacles lying only within a selected field of view and minimum range required for safe and effective maneuvering of the vehicle under the conditions of the vehicle's existing speed.

Also, by means of such limitations in the field of view and range-time of response, the effects of background energy received by the system are reduced. Further, because of the use of electrooptical techniques, display means may be employed to provide an indication of the direction of the sensed obstacle within the field of view, whereby the pilot may determine in which direction to maneuver his vehicle. Moreover, by means of the shorter wavelength of such coherent light pulses, slender obstacles (which are otherwise undetectable by prior-art radar means) may be detected.

Accordingly, it is an object of the subject invention to provide improved means for detecting small obstacles in the path of a moving vehicle.

It is another object of the subject invention to provide pulsed coherent light means for detecting obstacles lying within a selected range and field of view.

It is still another object of the subject invention to provide obstacle detection means having improved signal-to-noise performance by controlling the maximum range and field of view performance of such detection means as a function of the speed of a utilizing vehicle in which said detection means is utilized.

It is a further object of the invention to provide means for varying the field of view of obstacle-detection imaging means without compromising the image resolution of such imaging means.

These and further objects of the subject invention will become apparent from the following specification, taken together with the accompanying drawings in which.

In the figures, like reference characters refer to like parts.

Figure 1:
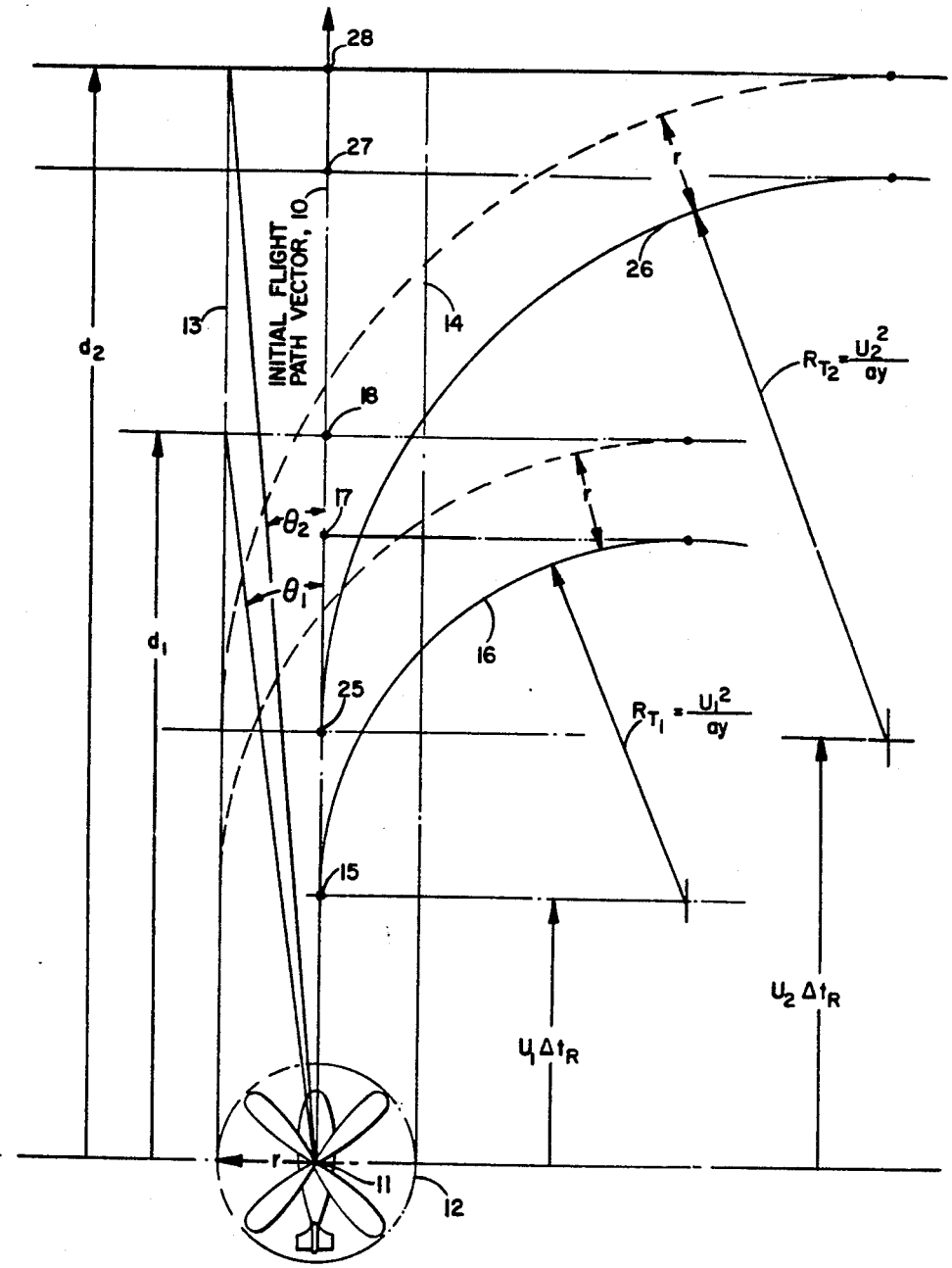
FIG. 1 is a diagram of the geometry of a tactical situation in which the device of the invention may be advantageously employed.

Referring to FIG. 1, there is illustrated an exemplary plan view of the trajectory geometry of a tactical obstacle warning situation, wherein line 10 represents a projection of the initial flight path or velocity vector of a vehicle such as a military helicopter located at point 11. Circular locus 12 about point 11 (as a center thereof) represents at least the radius ($r$) of the vehicle main rotor or other maximum vehicle extremity normal to flight path 10. Hence, dashed lines 13 and 14 tangent to circle 12 and parallel to and on opposite sides of flight path 10, represent the extremities or width of an obstacle-free strip required for adequate lateral clearance and safe transit of vehicle 11 along flight path 10.

If an obstacle were to be detected within the above-described strip, such detection, of necessity, must occur at least at a minimum range within which the pilot would be enabled to evasively maneuver his vehicle and thereby avoid the obstacle. Such minimum range is generally determined by the speed ($U$) of the vehicle, the transport lag or reaction time ($\Delta t$) in which to initiate a maneuver, and the lateral maneuver-acceleration performance ($a_y$) of the vehicle.

Where the flight path is obstructed by a single slender obstacle, such as a suspended cable or the like, the vehicle need maneuver only to the extent required to avoid such single slender obstacle. However, where the obstacle may consist of an array of such cables extending across the flight path, then the vehicle must maneuver at a minimum range which would at least enable the vehicle to perform a quarter-turn and fly tangent or parallel to, and at the selected lateral clearance distance from, such array. In this way the limited view angle of the obstacle sensor may effectively detect additional obstacles within the field of view of the altered flight path so as to similarly safely avoid them. Alternatively, the sensor may determine the end or extent of the obstacle array, whereby the pilot may be enabled to resume his intended course line or flight path.

The maneuver-flight path to be undertaken in response to the detection and warning of an obstacle for a vehicle situated at point 11 in FIG. 1, is necessarily comprised of two component trajectories. The first component, indicated by that segment of line 10 between points 11 and 15, is a forward transfer or continuation along the vehicle flight path 10 due to the "transport lag" or reaction time of the system. The distance of such segment is determined by both the system reaction time ($\Delta t_r$) and the vehicle ground speed, U. The vehicle ground speed is adjustable by the pilot; however, the system reaction time interval is essentially a constant of about 2.1 seconds. Such time interval ($\Delta t_r$) is comprised of two components or sources: 0.1 second for data processing by the detection and obstacle warning apparatus, and about 2.0 seconds for pilot decision and reaction to the warning signal. In view of the fact that the reaction time ($\Delta t_r$) of the system (including the human pilot) is relatively fixed, the forward transfer $\Delta d_r$ or length of segment 15 varies essentially only as the vehicle velocity (U) varies:

$$\Delta d_r = U \Delta t_r \qquad (1)$$

The second component of the maneuver flight path, indicated by curved segment 16, is a (lateral) turning maneuver of substantially fixed curvature. The incremental forward transfer measured parallel to the initial flight path 10, in performing a quarter-turn maneuver, is the turning radius itself ($R_T$) measured from point 15 along line 10 to point 17. The radius of curvature $R_T$ of such turning maneuver is a function of the maneuver acceleration $a_y$ and the square of the forward velocity, U, as follows:

$$R_T = \frac{U^2}{a_y} \qquad (2)$$

Accordingly, it is appreciated that the radius of curvature necessarily increases with the square of the forward velocity.

Therefore, the effect of increased vehicle velocity, in increasing both the forward transfer (point 15) and radius of curvature of curve 16, is to increase the minimum range at which a flight path obstacle must be detected, in order to safely maneuver so as to avoid such obstacle.

The range ($d$) at which the obstacle (or array of obstacles) should be detected should also include an allowance for the desired minimum lateral clearance ($r$) to be maintained in maneuvering to fly tangent or parallel to such array, indicated by the incremental distance along line 10 between points 17 and 18 in FIG. 1. Therefore, the minimum distance at which an obstacle array must be detected is equal to the sum of the forward transfer components due to reaction time (Equation 1), the turning radius of a quarter-turn maneuver (Equation 2), and a desired lateral clearance ($r$):

$$d(U) = r + U \Delta t_r + \frac{U^2}{a_y} \qquad (3)$$

where $r$, $\Delta t_r$, and $a_y$ are constants.

If, for example, an obstacle is detected within the corridor of lines 13 and 14 and at a range $d_1$ when the vehicle 11 (of FIG. 1) is travelling at a nominal velocity $U_1$ (such range $d_1$ corresponding to the total maximum forward transfer in effecting a turning maneuver 16 within a specified clearance distance ($r$) of the obstacle), then the maneuver may be safely executed either to the right or left (of the initial flight path).

If now the vehicle speed is increased to $U_2 > U_1$, then the forward transfer of the first segment of the maneuver trajectory is increased from point 15 to point 25 and the turning radius is increased to $R_{T_2} > R_{T_1}$ for a second curve 26 providing an associated forward transfer segment along line 10 between points 25 and 27, whereby a maximum forward transfer $d_2$ is required within which to effect the quarter-turn maneuver. Hence, the dimension $d_2$ represents a minimum range at which an obstacle is desired to be detected for such increased speed.

In the graphical determination of ranges $d_1$ and $d_2$ in FIG. 1, the effect of the radius dimension of the rotor locus 12 may be ignored where such radius is normally very small relative to the other factors affecting $d_1$ and $d_2$, the lateral dimensions of FIG. 1 being exaggerated for convenience in exposition. While the effect of such radius dimension is to correspondingly increase distances $d_1$ and $d_2$, such increase may be somewhat provided for by mounting the obstacle sensor in the nose of the vehicle, i.e., forward of point 11.

The corresponding half-angles $\theta_1$ and $\theta_2$ of the minimum allowable sensor fields of view associated with respective velocities $U_1$ and $U_2$, are defined as the arctangent of the radius $r$ (of locus 12) divided by the corresponding one of reaction distances, $d_1$ and $d_2$:

$$\theta = \tan^{-1} \frac{r}{d} = \tan^{-1} \left[ \frac{r}{r + U \Delta t_r + \frac{U^2}{a_y}} \right] \qquad (4)$$

Hence, where $r$, $\Delta t_r$ and $a_y$ are each essentially constants, the half-angle $\theta$ is seen to vary as an inverse function of the velocity, U. However, it is to be appreciated that, in the case of a particular vehicle having a limited range of velocities of interest, a simplified linearized approximation may be substituted for Equation 4, as is well understood in the art.

Figure 2:
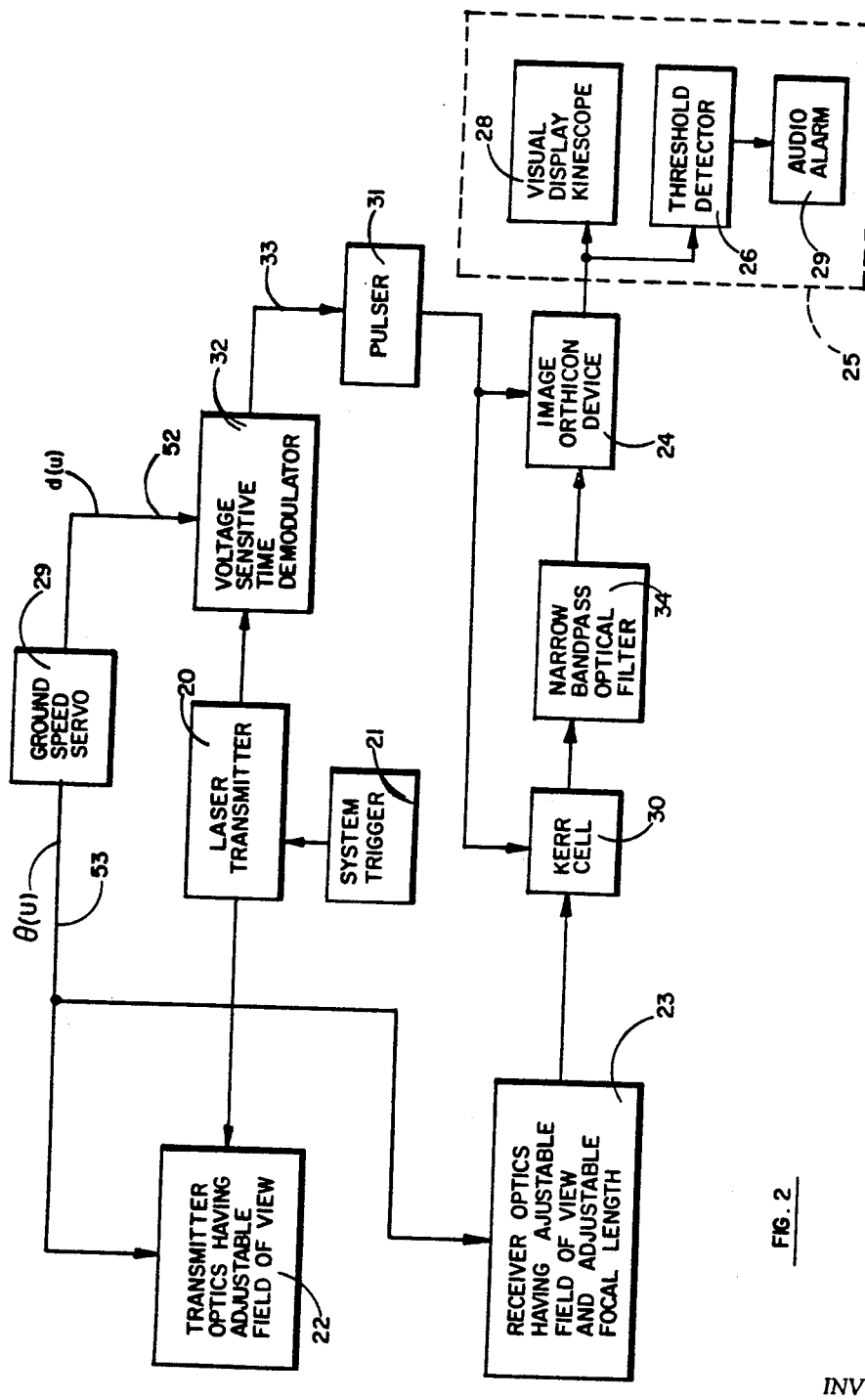
FIG. 2 is a block diagram of a system embodying the concept of the invention.

An obstacle sensing system for detecting the presence of obstacles at a selected distance within a selected corridor is shown in FIG. 2.

Referring to FIG. 2, there is illustrated a block diagram of a system employing the concept of the invention. There is provided a ruby laser 20 or similar source of cyclically pulsed coherent light having a preselected spectral bandwidth. The cyclical period or pulse repetition period of the pulsed narrow bandwidth light energy is determined by a free-running multivibrator or other trigger signal source 21 arranged to control the pump of laser source 20. The construction and arrangement of laser source 20 is known in the art, being described (for example) in "Lasers" by Lengyel, published by Wiley and Sons (1962). Therefore, element 20 is shown in block form only in FIG. 2. The pulsed coherent light energy of source 20 is directed to a target area represented by a selected field of view (or field of illumination), by means of an adjustable transmitter optical system 22 having an adjustable field of illumination.

Reflected energy, from target sources reflecting the pulsed energy transmitted by the transmitter optics, is received by a receiver optical system 23, having an adjustable field of view and adjustable focal length, and directed to the aperture of a gated image orthicon device 24. The construction and arrangement of image orthicons are well known in the art, being commercially available, for example, from the Electron Tube Division of Westinghouse-Electric Corporation, Elmira, N.Y.; and therefore element 24 is shown in block form only.

The output of image orthicon device 24 may be fed to signal utilization means 25. In a warning system application, for example, such signal utilization means may comprise a threshold signalling device 26 and audio signalling means 27 responsive thereto for providing an audible warning signal upon the detection by orthicon device 24 of a target return which produces a signal above a certain threshold level. Such utilization means may further comprise a kinescope 28 or like means for providing a visual image indicating the direction of the detected target within the receiver optics field of view.

The transmitter and receiver optics are mutually boresighted, whereby the receiver optical axis is aligned parallel in azimuth and elevation with the optical axis of the transmitter optics. Such optical axes may be also space-stabilized and preferably maintained in azimuth in the direction of the flight vector 10 (of FIG. 1) by means well known to those skilled in the art. Because such orientation means is known, a description of the same has been omitted for convenience in exposition.

There is further provided control means 29 for concomitantly controlling the fields of view of the transmitter and receiver optics 22 and 23, as a function of ground speed. Such device provides that the fields of view of the two optical systems are substantially similar and equal to that field of view defined by Equation 4. In this way, the transmitter energy of laser 20 is concentrated within a cone of a preselected half-angle $\theta$, as to assure maximum illumination or energy per unit of illuminated area of the corridor of FIG. 1 at the range ($d$) of interest. Further, the receiver optics, in being similarly adjusted, will be responsive to reflected signals received from obstacles within such illuminated cone, while being substantially insensitive to background energy outside the cone of illumination. In other words, the signal-to-noise ratio is improved by such coincident arrangement of the transmitter and receiver fields of view. Further, the concomitant adjustment of the fields of view as a function of the ground speed of a utilizing vehicle assures that the energy is as concentrated, conceptually, at the critical range or distance ($d(U)$) as the velocity (U) of the vehicle will allow, thereby further enhancing the signal-to-noise ratio for targets within the range of interest.

Ground-speed servo 29 may be comprised of electromechanical means driving a nonlinearly wound potentiometer in response to the vehicle velocity, whereby an analog view angle control output 53 is provided, in accordance with the relationship of Equation 4. A second output 52 is similarly provided in accordance with the relationship of Equation 3. Element 29 is shown in block form only in FIG. 2 for convenience in exposition. However, the construction and arrangement of servo 29 is understood in the art, an exemplary arrangement thereof being shown in FIG. 7.

Figure 7:
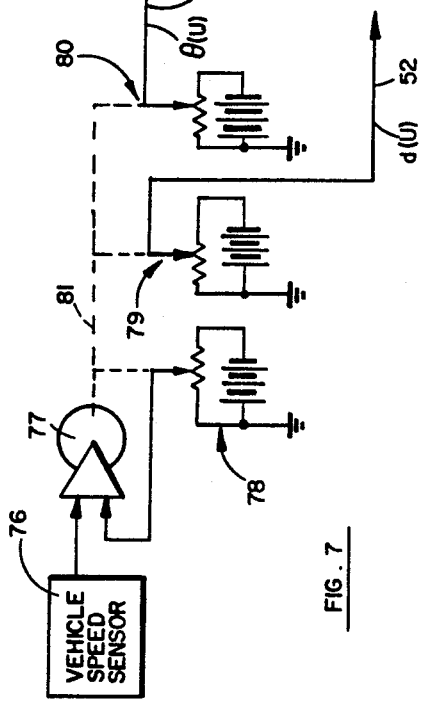
FIG. 7 is a schematic diagram of an exemplary arrangement for the speed servo of FIG. 2.

Referring to FIG. 7, there is illustrated an exemplary arrangement of the speed servo 29 of FIG. 2. There is provided a servomotor 77 in a negative feedback positional control arrangement, being responsive to both the output of a speed sensor 76 and the feedback signal from a motor shaft position pick-off potentiometer 78. Hence, in normal operation, the position of the motor shaft 81 is indicative of the speed sensed by sensor 76, as is well-understood in the servomechanism art. There are further provided two additional potentiometers 79 and 80 mechanically driven by the output shaft 81 of motor 77. Each of function potentiometers 79 and 80 is selectively responsive to the mechanical input from motor 77 (and, hence to the sensed speed) in accordance with a selected function, potentiometer 79 being responsive in accordance with the function described by Equation 3, and potentiometer 80 being responsive in accordance with function described by Equation 4. The construction of function generator potentiometers is well understood in the art, being described for example at pages 314–316 of "Electronic Analog Computers" by Korn and Korn (second edition) published by McGraw-Hill (1956).

Referring again to FIG. 2, although means have been described thus far for reducing the sensitivity to energy outside the illuminated cone defined by the half-angle $\theta$, there is further provided means for reducing the sensitivity of the image orthicon to received energy from targets within the field of view but at a greater range than the preselected range or distance of interest, $d(U)$, of FIG. 1 and Equation 3. Because such distant targets are manifested by the later range-time of arrival of the associated received signals, the sensitivity of the system to such later-arriving signals is reduced by an appropriately delayed gating-off of the receiver optics by a Kerr-cell 30, or similar device interposed between the output of the receiver optics 23 and the input to the image orthicon device 24, and responsively connected to a source 31 of a delayed electrical signal for gating an optical path.

The construction and arrangement of Kerr cell 30 are well known to those skilled in the art, being described (for example) in "Lasers" by Lengyel, published by Wiley & Sons (1962). Such devices are commercially available from Electro-Optical Instruments Co. of Pasadena, Calif. Therefore, element 30 is shown in block form only in FIG. 2.

Source 31 provides gating signals for gating-on the received energy for an interval during each pulse repetition period occurring between a preselected minimum delay time after each generated pulse (generated by laser 20) and a selected maximum range-time corresponding to the distance $d(U)$ of FIG. 1, where $d$ is a function of the vehicle forward velocity, U. In other words, the gating signal is cyclically generated in a preselected delayed time relationship relative to the output of laser 20. The purpose of such preselected delay is to minimize receiver response to near field backscatter (corresponding to the glare reflected back from one's own headlights when driving a car in fog) as will be explained more fully hereinafter.

The occurrence of the gating signal is controlled by interposing a voltage-sensitive signal delay element 32 between an output of laser 20 and an input of signal source 31. A control input of voltage-controlled delay element 32 is connected to the second output 52 of ground speed servo 29 for adjusting the occurrence of the signal provided by element 32 in accordance with the relationship of Equation 3. In actual construction and arrangement, voltage-controlled means 32 is essentially a time-modulator, providing a two-state signal output the duration of one state of which is varied for controlling the response time of signalling means 31, as will be explained more fully hereinafter.

Hence, the output of signalling means 31 causes Kerr cell 30 (of FIG. 2) to limit the response of the image orthicon 24 to targets (within the field of view) lying within a selected distance or range-time. Such limited allowable response time reduces system response to both nearfield back scatter and to far-field clutter; and also limits the exposure of the image orthicon to background energy occurring due to other than reflections of the energy transmitted by laser 20.

The response of image orthicon 24 to background energy is additionally attenuated by the insertion of a narrow bandpass optical filter 34 interposed between the output of received optics 23 and image orthicon device 24, the bandpass of optical filter 34 comprising the frequency spectrum or color of light transmitted by laser 20. In this way the target image response of image orthicon element 24 is enhanced, because of the random and low-level content of received background energy (principally reflected solar energy) having such color, relative to received reflections of transmitted energy reflected from targets within the field of view and range of interest.

After the gating-off of range-gated Kerr-cell 31, background energy continues to fall upon the input aperture of the image orthicon, due to light-leakage through, or imperfect gating of, Kerr cell 31. Since the image orthicon device 24 tends to provide an output indicative of the time integral of the (nonpulsed) background energy falling upon the input aperture of such sensor, the operation of the image orthicon device itself is gated in synchronism with the Kerr cell in order to avoid such effect due to light leakage through the gated-off Kerr cell. This may be done by electrically connecting the photocathode of the image orthicon to gating signal source 31.

Hence, in normal operation of the device of FIG. 2, pulsed coherent light energy having a narrow spectral line is generated by laser 20, and directed at a selected minimum field of view. The transmitted energy is thus concentrated within a selected corridor at a range within which an obstacle must be detected in order to successfully maneuver so as to avoid such detected obstacle. Both the selected field of view and range are programmed as functions of the vehicle velocity by servo means 29.

The obstacle detection means of FIG. 2 provides improved detection of the target by concomitantly adjusting the transmitter and receiver optics fields of view so as to be essentially the same, filtering by means of filter 34 the received light so as to remove energy other than that having a spectral content or color comprising the spectra of the energy transmitted by laser 20, and commonly range gating both Kerr cell 30 and image orthicon device 24 as a function of vehicle velocity, whereby the output response of the image means 24 to both (1) detected target outside a critical range and (2) background light energy, is reduced. In other words, improved detection of targets within a selected range and lateral corridor is effected by means of commonly programming the fields of view of the optics and the concomitant range-gating of the Kerr cell and image orthicon device as functions of the vehicle velocity.

An additional aspect of the programmable receiver optics relates to the effect of the reduction in the field of view half-angle, $\theta$ (of FIG. 1) on the image resolution of the output provided by image sensor 24. The image resolution or number of lines per unit area of an image orthicon device is fixed. Therefore, a reduction in the active or employed area of the image orthicon, in association with a reduction in the optical field of view, reduces the number of image lines available for such field of view, thereby reducing the image resolution of an image detected in such reduced field of view. Further, such reduced image resolution in association with a reduced field of view is particularly critical in the detection of small targets because such reduced field of view occurs in response to higher vehicle velocities, for which it is desired to detect such obstacles at greater ranges. Hence, the adjustable optics of receiver optical means 23 comprises concomitant adjustment of the focal length and field of view, whereby the employed or active area of the orthicon device 24 remains substantially the same, despite adjustment or variation of the field of view of the receiver optics, as will be more fully described hereinafter.

In other words, the maximum available number of image lines or image resolution of the image orthicon 24 (of FIG. 2) is utilized for maximum target resolution, while maximum target contrast or signal-to-noise ratio is obtained, by programming the receiver and transmitter optics and gating the receiver optics, all as functions of vehicle velocity.

The construction and arrangement of certain elements of FIG. 2 are shown in more particularity in FIGS. 3, 4, 5 and 6.

Figure 3:
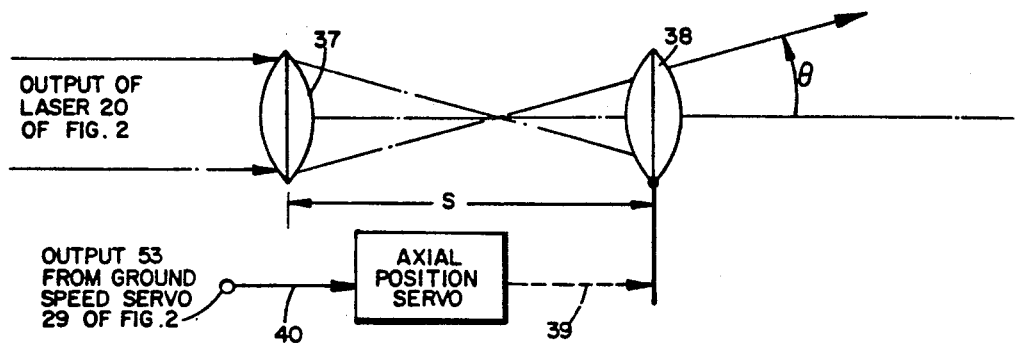
FIG. 3 is a schematic arrangement of an exemplary embodiment of the transmitter optics of FIG. 2.

Referring to FIG. 3, there is illustrated a schematic diagram of the transmitter optics 22 of FIG. 2. There is provided a first fixed lens 37 and a second adjustable lens 38 comprising a lens system, the axial distance ($s$) between which mutually optically alined lenses is adjustable by means of a positional servo 39 in mechanically driving relation to adjustable lens 38. First lens 37 is situated in the optical path of the output of laser 20 (of FIG .2), and cooperates with second lens 38 to provide a selected field of illumination (indicated by the half-angle $\theta$) for such output energy in accordance with the radial distance, $s$ (of FIG. 3). An electrical input 40 of servo 39 is responsively connected to first output 52 of ground servo 29 (of FIG. 2), whereby the field of illumination provided by the cooperation of laser 20 (of FIG. 1) with the lens system of FIG. 3 may be adjusted or controlled in accordance with the relationship of Equation 4.

Figure 4:
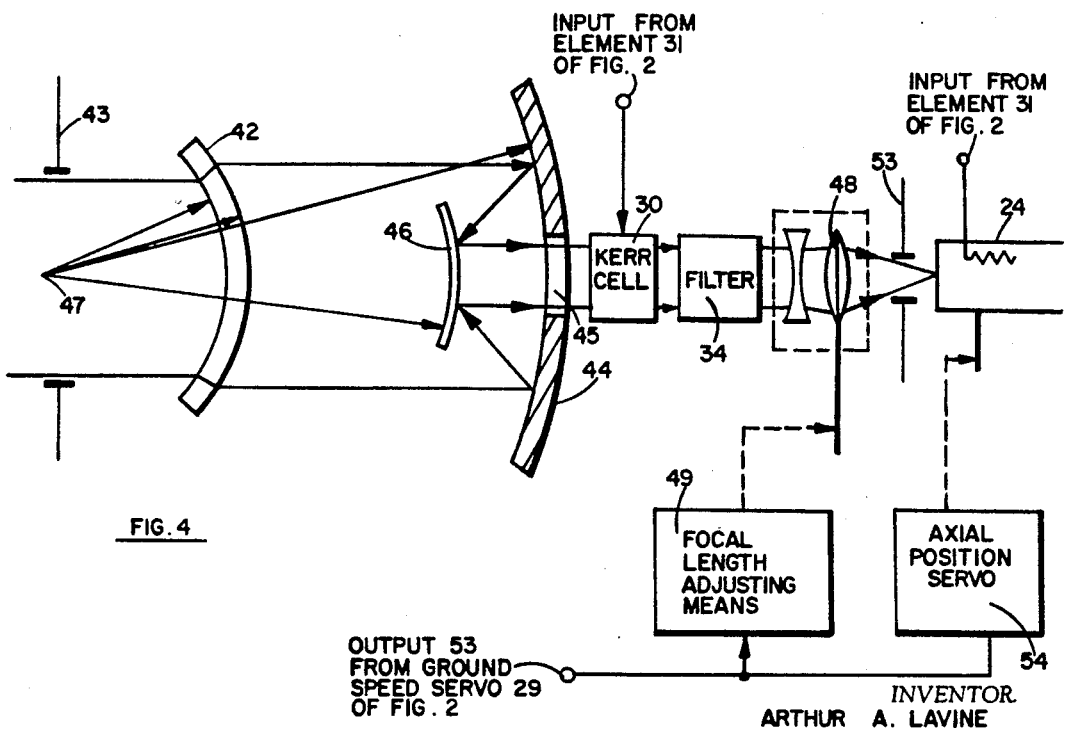
FIG. 4 is a schematic arrangement of the receiver optics of FIG. 2.

The construction and arrangement of the corresponding receiver optics are shown in FIG. 4.

Referring to FIG. 4, there is illustrated a schematic diagram of the receiver optics 23 of FIG. 2. There is provided an optical receiving system of FIG. 2, including image orthicon device 24 shown with an adjustable field stop 53 or receiving aperture, Kerr cell 30, and filter 34. There is further provided means for varying the field of view of the receiving optics without substantially varying the image resolution of the orthicon device to the selected field of view. Such receiving optics comprise concentric optical means having a spherical input lens 42, the concave surface of which is directed at a field of view provided by a fixed aperture 43. A concave mirror 44 having a central aperture 45, has its annular reflecting surface directed at the convex side of the input lens 42 to receive illumination therefrom. A second convex spherical mirror 46 (having a lesser field of view) is interposed between lens 42 and first mirror 44, the reflective convex surface of the second mirror 46 oriented for redirecting reflections from first mirror 44 through the aperture 45 thereof.

All of spherical surfaces 42, 44 and 46 have a common center of curvature 47, whereby the surfaces are said to be mutually concentric. The purpose of such concentric spherical optical system is to provide a more accurate, smaller, cheaper and more effective, wide-angle light-gathering device than normal, so called "small $f$ number" systems which are subject to spherical aberration despite expensive parabolic-lens grinding techniques.

Although a reflective telescope is illustrated in FIG. 4, it is to be understood that the device of the invention is not so limited, and that a refractive telescope could be employed. Further, for utilization of the invention in high velocity vehicles wherein unusually wide view angles are not required, the telescope need not be limited to a concentric optics type telescope.

There is further provided adjustable focal length means interposed between aperture 45 and the adjustable field stop 53 of image orthicon device 24. Such adjustable focal length means may be comprised of a deformable lens 48 deformed by a mechanical force supplied by electromechanical means 49 in response to electrical control signals from ground speed servo 29 (of FIG. 2). Such a deformable lens, demonstrating an adjustable focal length, is known to the art, being described (for example) in U.S. Patent No. 2,300,251, issued on Oct. 27, 1942 to E. F. Flint for a Variable Focus Lens. Alternatively, electromechanical means 49 and element 48 may comprise a turret for selecting one of a plurality of lenses of successively differing focal lengths in response to discrete levels of the electrical input from ground speed servo 29.

Associated with such means for adjusting the focal length to adjust the field of view of the receiving optics as a function of the speed of a utilizing vehicle, is an axial position servo 54 responsive to the first electrical output 52 of ground speed servo 29 (of FIG. 2) for servoing the position image orthicon device 24 axially to the adjusted image distance provided by adjustable lens 48.

By means of the arrangement of FIG. 4, the focal length adjusting means 49 and axial position servo 54 cooperate with ground speed servo 29 so that element 49 adjusts the optical field of view of the device of FIG. 4 while element 54 compensates for image size changes (caused by the cooperation of elements 48 and 49) whereby the maximum range fixed field (at photocathode 50) for each associated fixed angle is maintained substantially invariant with changes in the field angle, $\theta$.

Alternatively, the combined functions of elements 48, 49 and 54 may be combined in a turret comprising a plurality of telescopes each having a preselected focal length and view angle and being spaced at a preselected axial distance from image orthicon device 24.

Figure 5:
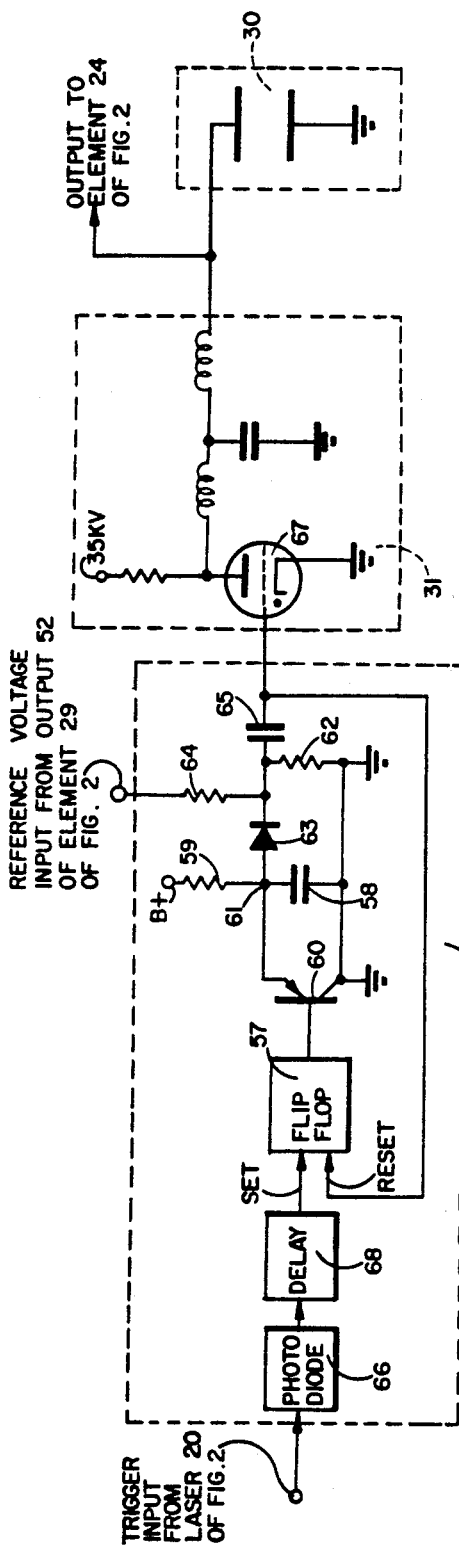
FIG. 5 is a schematic diagram of the variable time delay and pulser devices of FIG. 2.

An exemplary arrangement of the variable time delay and pulser elements of FIG. 2 are shown more particularly in FIG. 5.

Referring to FIG. 5, there is illustrated an exemplary schematic circuit of variable time delay element 32 and pulser 31 of FIG. 2. The variable time modulator 32 is comprised of a flip-flop 57 in cooperation with a sawtooth signal generator which includes a series R-C network (e.g., a capacitor 58 and a resistor 59 in series across a D-C voltage source) and a transistor 60 having its emitter and collector connected across capacitor 58. Interposed between the common connection 61 (of resistor 59 and capacitor 58) and a shunt output resistor 62 is a diode 63 or like unidirectional conductive device. A third resistor 64 interconnects shunt resistor 62 and a positive polarity D-C output of ground speed servo 29 (of FIG. 2) so as to back-bias diode 63.

An output capacitor 65 decouples the D-C supply voltage (of element 32) from the input to pulser 31, so that only pulses are transmitted from delay means 32 to the input of pulser 31. Alternatively, pulser 31 may be coupled to an output of flip-flop 57.

The state of bistable element 57 is controlled by a trigger input (corresponding to a zero or reference time) applied to one input thereof to "set" flip-flop 57 to a second state, and a feedback signal from coupling capacitor 65 applied to another or "reset" input of flip-flop 57. Where the system trigger is in the form of light energy from light source 20 of FIG. 2, then a photo diode 66 may be employed to provide an electrical signal in response to the light "trigger" for setting flip-flop 57 to the second state. Additionally, a time-delay element 68 is interposed between the output of photo diode 66 and the "set" input of flip-flop 57, for providing a delay corresponding to the occurrence of the near field backscatter effect, discussed above.

The pulser unit 31, of FIG. 5, may be any commercially available pulsing unit, such as those available from Edgerton, Germerhausen and Grier (EG&G) of Boston, Mass.

Figure 6:
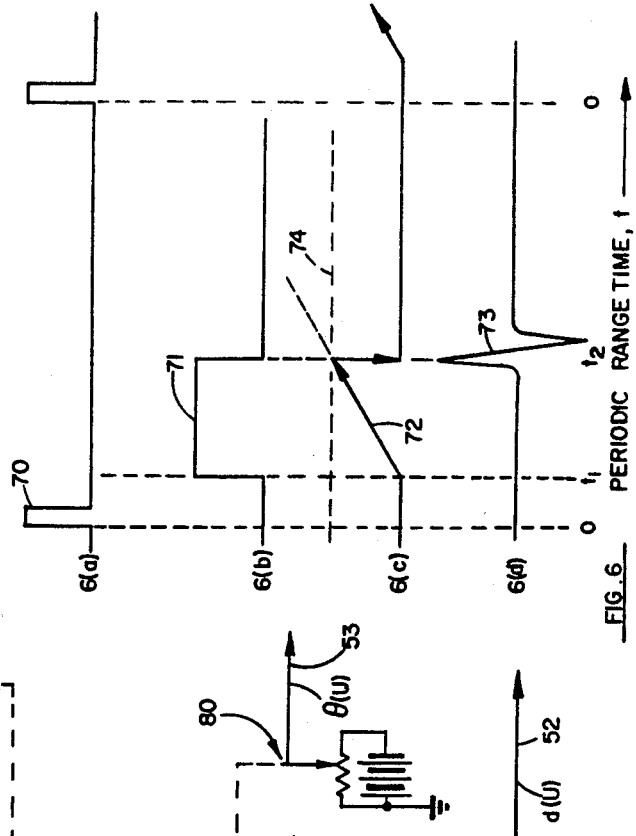
FIG. 6 is a family of time-histories of the response of several elements of the device of FIG. 5.

The operation of the device of FIG. 5 may be more easily appreciated from a consideration of the time-histories of the response thereof, as shown in FIG. 6.

Referring to FIG. 6, there are illustrated the time-histories of the responses of several elements of the device of FIG. 5. Curve 70 represents the "set" input to flip-flop 57 from the system trigger, curve 71 represents the state of flip-flop 57, curve 72 represents the potential charge across capacitor 58, and curve 73 represents the output of pulser 31. Curve 74 represents the back-bias on diode 62 provided by the output from speed servo 29 (of FIG. 2).

In normal operation of the device of FIG. 5, flip-flop 57 is in a first or reset state (curve 71 at time zero in FIG. 6), and turns on transistor 60, whereby capacitor 58 is essentially shorted (curve 72 at time zero in FIG. 6). In other words, the voltage across capacitor 58 is substantially zero.

When a system trigger (curve 70 at time zero in FIG. 6) is applied through delay element 68 to the "set" input of flip-flop 57, thereby subsequently setting flip-flop 57 in a second state (curve 71 between time $t_1$ and $t_2$), the output of flip-flop 57 applied to the control electrode of transistor 60 cuts off the emitter-collector of transistor 60. The non-conductive state of transistor 60 removes the shunt condition across capacitor 58, thereby allowing capacitor 58 to charge (curve 72 between time $t_1$ and $t_2$).

Capacitor 58 continues to charge so that its potential tends to approach the B+ value of the D-C supply. As the increasing potential across capacitor 58 equals and then exceeds the back-bias applied to diode 63 by the positive D-C input from speed servo 29 (of FIG. 2) (e.g., the amplitude of curve 72 equals that of curve 74 at $t_2$ in FIG. 6), the difference between the capacitor potential and such back bias is transmitted through coupling capacitor 65 as a doublet pulse (curve 73 at time $t_2$) to both the grid of thyratron 67 and the second or reset input of flip-flop 57, thereby causing pulsed condition of thyratron 67 and resetting flip-flop 57. The pulsed conduction of thyratron 67 transmits a pulse to Kerr cell 30 for a pulsewidth interval determined by the parameters of the L-C network interposed between the plate circuit of thyratron 67 and Kerr cell 30.

The resetting of flip-flop 57 (curve 71 after $t_2$ in FIG. 6) by the transmitted output from coupling capacitor 65 turns transistor 60 on, thereby restoring the short-circuit condition across capacitor 58 and reducing the charging potential thereacross below the back-bias applied to diode 63 (curve 72 after $t_2$ in FIG. 6).

The difference in time elapsing between the trigger input to photo diode 63 and the setting or turning-on of flip-flop 57 (curve 71 at $t_1$) is selected to correspond to an initial minimum range interval, whereby system response to the near-field back-scatter effect may be avoided; and is provided by delay element 68.

The difference in time elapsing between the trigger input to photo diode 63 and the resetting of flip-flop 57 (curve 71 at $t_2$) is selected to be equal to a desired range-time corresponding to a range of interest, $d$, at which it is desired to detect an obstacle. Such elapsed time is controlled by the magnitude of the back-bias applied to diode 63 by ground speed servo 29, and is therefore a function of the ground speed, U. Because the speed-controlled elapsed time represents a range of interest, the range-time itself is accordingly a function of the ground speed. The desired function, $d(U)$, is provided by the use of a nonlinear potentiometer or like function generator in the ground speed servo, whereby a control voltage or back-bias is provided at terminal 33 (of FIG. 5) in accordance with the relationship of Equation 3, as described above in connection with the description of FIG. 7.

Hence, pulser 31 gates on Kerr cell 30 (and image orthicon device 24) at an instant (curve 73 at $t_2$) corresponding to a desired range of interest, $d(U)$.

Accordingly, there has been described improved obstacle warning means employing pulsed light energy for detecting small objects at a selected range as a function of velocity including optical focusing and gating means in cooperation with an image orthicon device for improving the signal-to-noise performance of such warning device while maintaining a maximum available target image resolution.

While the warning device of the invention has been described in terms of certain criterion for azimuth maneuvering, it is to be understood that other criterion may be employed. Further, although the warning device has been described in terms of an azimuth maneuvering criterion, it is clear that the device is not so limited and that elevation or pitch-up criterion may be employed in the alternative. Moreover, both elevation and azimuth maneuvering criterion may be employed concurrently to provide a warning signal, whereby the pilot's attention may be directed to a display of the target area image, for deciding upon an evasive maneuver.

Although the invention has been illustrated and described in detail, it is to be clearly understood that the same is by way of illustration and example only and is not to be taken by way of limitation, the spirit and scope of this invention being limited only by the terms of the appended claims.

I claim:
1. In a vehicle having a speed sensor, a pulsed-light energy system for detecting the presence of obstacles within a selected view angle and at a selected range comprising:
   optical receiving means for detecting reflections of said light energy from said obstacles to-be-detected; and means adapted to be responsive to said speed sensor for selectively limiting both the view angle and range within which said optical receiving means is responsive to said received energy, whereby said vehicle may be enabled to be evasively maneuvered so as to avoid such obstacle.

2. In a vehicle having speed measuring means, a pulsed-light energy system for detecting the presence of obstacles within a selected view angle and selected range comprising:

optical receiving means for detecting reflections of said light energy from said obstacles to-be-detected;

means adapted to be responsive to said speed measuring means for decreasing the view angle of said optical receiving means with increasing speed of said vehicle; and optical gating means cooperating with said receiving means for increasing the selected range within which said obstacles may be detected with increasing speed of said vehicle, whereby said vehicle may be enabled to be evasively maneuvered so as to avoid such obstacle.

3. In a vehicle having speed measuring means, a pulsed-light energy system for detecting the presence of obstacles within a selected view angle and selected range comprising;

image orthicon means for detecting reflections of said light energy from said obstacles to-be-detected;

means for decreasing the view angle of said system with increasing speed of said vehicle while preserving the image resolution of said detected obstacles; and optical gating means cooperating with said image orthicon means for increasing the selected range within which said obstacles may be detected with increasing speed of said vehicle, whereby said vehicle may be enabled to be evasively maneuvered so as to avoid such obstacles.

4. Claim 3 in which said second mentioned means comprises means for increasing the axial distance between said image orthicon means and said second mentioned means with increasing speed of said vehicle.

5. In a vehicle having speed measuring means, a pulsed-light energy system for detecting the presence of obstacles within a selected view angle and selected range comprising;

optical receiving means for detecting reflections of said light energy from said obstacles to-be-detected;

means for decreasing the view angle of said receiving means device with increasing speed of said vehicle;

optical gating means for increasing the selected range at which said obstacles may be detected with increasing speed of said vehicle; and means comprising said gated receiving means and said view angle decreasing means for reducing the response of said system to background light energy, whereby small obstacles may be better detected at such ranges as to allow maneuvering of said vehicle so as to avoid such obstacles.

6. The device of claim 5 in which said fourth mentioned means further includes narrow bandpass optical filter means.

7. The device of claim 5 in which there is provided audio warning signal means and kinescope image display means commonly responsive to said optical receiving means.

8. In an obstacle detection system employing pulsed light energy;

generating means for cyclically generating pulses of light energy of a preselected spectral bandwidth;

adjustable transmitter optical means for directing said light energy upon a selected field of view;

an image orthicon device;

receiver optical means for directing received reflections of said directed energy to said image orthicon device;

adjustable focal length means interposed between said receiver optical means and said image orthicon device; and control means for concomitantly adjusting said selected field of view and said adjustable focal length means as functions of the speed of a utilizing vehicle in which said system is utilized.

9. The device of claim 8 in which is further provided optical gating means cooperating with said receiver optical means for gating-on said received energy during a selected interval occurring during each pulse repetition period.

10. The device of claim 8 in which is further provided optical gating means cooperating with said receiver optical means for gating-on said received energy at a preselected minimum time after each generated pulse and for a selected duration interval as a function of the speed of a utilizing vehicle in which said device is utilized.

11. An obstacle warning system for detecting obstacles disposed along the path of a moving vehicle, comprising:

a laser device for cyclically generating pulses of light energy of a preselected spectral bandwidth, adjustable transmitter optical means for directing said light energy upon a selected field of view;

an image orthicon device;

adjustable receiver optical means for directing received reflections of said energy from said selected field of view through the field aperture of said image orthicon device;

a Kerr cell interposed between the output of said reciver optical system and the input aperture of said image orthicon device;

a narrow bandpass optical filter interposed between an input to said receiver optical system and said input aperture of said image orthicon device, the bandpass of said filter comprising the spectral bandwidth of said generated light;

voltage sensitive gating means for providing a gate-on signal pulse of variable duration subsequent to each generated pulse of light energy;

said image orthicon device and said Kerr cell being commonly responsive to said voltage-sensitive gating means; and servo means for similarly and concomitantly adjusting the fields of view of said transmitter optical system and said receiver optical system, said servo means and said gating means being severally responsive to the speed of a utilizing vehicle whereby said fields of view decrease and the duration of said gating-on signal increases with an increase in said speed of said vehicle.

12. The device of claim 11 in which there is provided audio signal warning means responsive to said image orthicon device for directing a human operator's attention, and visual display means responsive to said image orthicon device for providing a visual display of the image sensed by the image orthicon device.

References Cited

UNITED STATES PATENTS

| | | | |
|---|---|---|---|
| 2,716,746 | 8/1955 | Howery | 343—7.4 |
| 2,996,946 | 8/1961 | Brendholdt | 88—1 |
| 3,064,526 | 11/1962 | Lindsay | 88—57 |
| 3,150,363 | 9/1964 | Finvold | 343—5 |
| 3,152,214 | 10/1964 | Korones | 88—57 |
| 3,215,038 | 11/1965 | Heller | 250—199 |

ROBERT L. GRIFFIN, *Primary Examiner.*

CHESTER L. JUSTUS, RODNEY D. BENNETT,
*Examiners.*

G. M. FISHER, D. C. KAUFMAN, A. MAYER,
*Assistant Examiners.*

UNITED STATES PATENT OFFICE
CERTIFICATE OF CORRECTION

Patent No. 3,390,271　　　　　　　　　　　　June 25, 1968

Arthur A. Lavine

It is certified that error appears in the above identified patent and that said Letters Patent are hereby corrected as shown below:

In the heading to the printed specification, after line 6, insert -- (Filed under Rule 47 (b) and 35 U. S. C. 118) --.

Signed and sealed this 22nd day of July 1969.

(SEAL)
Attest:

Edward M. Fletcher, Jr.　　　　　　　　　WILLIAM E. SCHUYLER, JR.
Attesting Officer　　　　　　　　　　　　Commissioner of Patents